US009268953B2

(12) United States Patent
Zhao et al.

(10) Patent No.: US 9,268,953 B2
(45) Date of Patent: Feb. 23, 2016

(54) METHOD OF PERFORMING MICROPROCESSOR ALU INTEGRITY TEST OVER A DISTRIBUTED ASYNCHRONOUS SERIAL COMMUNICATION NETWORK FOR ASIL-D LEVEL SAFETY CRITICAL APPLICATIONS

(71) Applicant: GM Global Technology Operations LLC, Detroit, MI (US)

(72) Inventors: Ming Zhao, Northville, MI (US); Michael J. Abowd, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 14/268,180

(22) Filed: May 2, 2014

(65) Prior Publication Data

US 2015/0213277 A1    Jul. 30, 2015

Related U.S. Application Data

(60) Provisional application No. 61/931,251, filed on Jan. 24, 2014.

(51) Int. Cl.
*H04L 29/06* (2006.01)
*G06F 21/60* (2013.01)
*G06F 13/42* (2006.01)

(52) U.S. Cl.
CPC .......... *G06F 21/602* (2013.01); *G06F 13/4221* (2013.01)

(58) Field of Classification Search
CPC ............................. G06F 21/602; G06F 13/4221

USPC .......................................................... 713/189
See application file for complete search history.

(56) References Cited

U.S. PATENT DOCUMENTS

| 6,088,639 A * | 7/2000 | Fayyad .................... B60R 21/01 180/271 |
| 6,401,207 B1 * | 6/2002 | Funakoshi ............... B60R 25/04 380/262 |
| 7,689,871 B2 | 3/2010 | Hagman |
| 8,380,392 B2 | 2/2013 | Trush et al. |
| 8,386,101 B2 | 2/2013 | West et al. |
| 2005/0268178 A1 | 12/2005 | Hagman |

(Continued)

FOREIGN PATENT DOCUMENTS

| DE | 102004022624 A1 | 12/2005 |
| DE | 102008055805 A1 | 6/2009 |

(Continued)

*Primary Examiner* — Michael S McNally

(57) ABSTRACT

A system includes first and second modules of a vehicle. The first module stores at least one seed value, calculates a key based on the at least one seed value, forms a seed key pair based on the calculated key and the at least one seed value, generates a data bus message including the seed key pair and data corresponding to operation of the first module, and transmits, over a distributed vehicle network, the data bus message. The second module receives the data bus message over the distributed vehicle network, retrieves the seed key pair from the data bus message, determines whether the calculated key matches an expected key, and selectively verifies integrity of the first module based on the determination of whether the calculated key matches the expected key.

19 Claims, 6 Drawing Sheets

(56) References Cited

U.S. PATENT DOCUMENTS

| | | |
|---|---|---|
| 2009/0118881 A1 | 5/2009 | West et al. |
| 2009/0125171 A1 | 5/2009 | West et al. |
| 2009/0252324 A1* | 10/2009 | Seleznev ............... H04L 9/08 380/200 |
| 2011/0225417 A1* | 9/2011 | Maharajh ............. G06F 21/10 713/150 |
| 2011/0257833 A1 | 10/2011 | Trush et al. |
| 2012/0310467 A1 | 12/2012 | Faucett et al. |
| 2014/0089685 A1* | 3/2014 | Suzuki ................. H04L 9/3278 713/193 |
| 2015/0271146 A1* | 9/2015 | Holyfield ............... G06F 21/73 713/171 |

FOREIGN PATENT DOCUMENTS

| | | |
|---|---|---|
| DE | 102008055924 A1 | 6/2009 |
| DE | 102011016514 A1 | 1/2012 |

* cited by examiner

METHOD OF PERFORMING MICROPROCESSOR ALU INTEGRITY TEST OVER A DISTRIBUTED ASYNCHRONOUS SERIAL COMMUNICATION NETWORK FOR ASIL-D LEVEL SAFETY CRITICAL APPLICATIONS

CROSS-REFERENCE TO RELATED APPLICATIONS

This application claims the benefit of U.S. Provisional Application No. 61/931,251, filed on Jan. 24, 2014. The disclosure of the above application is incorporated herein by reference in its entirety.

FIELD

The present disclosure relates to ensuring safety integrity of a microprocessor used for monitoring sensor data in automotive applications.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An automotive electronic control system for a vehicle controls vehicle functions including, but not limited to, vehicle propulsion, braking, steering, and transmission operation. One or more main microprocessors (e.g., within electronic control units, or ECUs) execute software and/or perform calculations associated with the control of these vehicle functions. The microprocessors may communicate with other microprocessors and components of the electronic control system over a distributed asynchronous serial communication network such as a controller area network (CAN) bus.

The main microprocessors within the corresponding ECUs execute software related to control of various vehicle functions over the CAN bus, and one or more microprocessors may monitor another one of the microprocessors over the CAN bus. For example, a main microprocessor may monitor another microprocessor associated with a vehicle sensor. As such, vehicle performance depends on the integrity of the main microprocessors.

SUMMARY

A system includes first and second modules of a vehicle. The first module stores at least one seed value, calculates a key based on the at least one seed value, forms a seed key pair based on the calculated key and the at least one seed value, generates a data bus message including the seed key pair and data corresponding to operation of the first module, and transmits, over a distributed vehicle network, the data bus message. The second module receives the data bus message over the distributed vehicle network, retrieves the seed key pair from the data bus message, determines whether the calculated key matches an expected key, and selectively verifies integrity of the first module based on the determination of whether the calculated key matches the expected key.

In other features, the first module stores at least one seed value, calculates a key based on the at least one seed value, determines whether the calculated key matches an expected key stored within the first module, forms a seed key pair based on the determination and the at least one seed value, generates a data bus message including the seed key pair and data corresponding to operation of the first module, and transmits, over a distributed vehicle network, the data bus message. The second module receives the data bus message over the distributed vehicle network, retrieves the seed key pair from the data bus message, determines whether the seed key pair includes an indication that the calculated key matched the expected key, and selectively verifies integrity of the first module based on the determination of whether the seed key pair included the indication that the calculated key matched the expected key.

A method for verifying the integrity of a first microprocessor in a vehicle using a second microprocessor in the vehicle includes, in a first module that includes the first microprocessor, storing at least one seed value, calculating a key based on the at least one seed value, forming a seed key pair based on the calculated key and the at least one seed value, generating a data bus message including the seed key pair and data corresponding to operation of the first module, and transmitting, over a distributed vehicle network, the data bus message. The method includes, in a second module that includes the second microprocessor, receiving the data bus message over the distributed vehicle network, retrieving the seed key pair from the data bus message, determining whether the calculated key matches an expected key, and selectively verifying integrity of the first microprocessor based on the determination of whether the calculated key matches the expected key.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more dedicated secondary microprocessors that monitor respective main microprocessors. For example, an electronic control unit (ECU) or module may include main microprocessor and a secondary microprocessor to verify the integrity of the main microprocessor. The secondary microprocessor may verify the integrity of the main microprocessor by, for example, exchanging seeds and keys with the main processor (over, for example only, a full duplex Serial Peripheral Interface bus). The vehicle may implement diagnostics to verify the integrity of the main microprocessor, such as verifying the integrity of an arithmetic logic unit (ALU) of the main processor according to an Automotive Safety Integrity Level (ASIL) D standard.

Some vehicle control features, such as an Electronic Transmission Range Shifter (ETRS), may require a dedicated input module (e.g., a sensor input module, or SIM) having an associated microprocessor to process sensor hardware inputs at a high sampling rate. Processed sensor input data is then transmitted over the controller area network (CAN) bus to a main microprocessor associated with an ECU such as an engine control module (ECM) or transmission control module (TCM). The ECM (or the TCM or other main microprocessor) may monitor the microprocessor of the SIM over the CAN bus. A secondary microprocessor of the ECM may in turn verify the integrity of the main microprocessor.

Some systems may attempt to eliminate the dedicated secondary microprocessor and instead verify the integrity of the main microprocessor (e.g., of a first ECU) over the CAN bus using another main microprocessor (e.g., of a second ECU). However, a vehicle system conforming to ASIL-D level standards may require a diagnostic time window of 200 milliseconds for detecting certain failure conditions. Accordingly, verifying the integrity of a main microprocessor using another main microprocessor instead of a dedicated secondary microprocessor located in the same module may require a time greater than the 200 millisecond diagnostic time window.

Microprocessor verification systems and methods of the present disclosure perform microprocessor implement ALU integrity verification across two or more ECUs (e.g., between two main processors in different ECUs). For example, the monitored ECU transmits a "Seed-Key Pair" (SKP) to a monitoring ECU in one-directional CAN bus messages along with the processed sensor input data. Accordingly, a step of transmitting a request for the SKP from one ECU to another can be eliminated. Further, these systems and methods still apply a strategy of protecting safety critical signals over the CAN bus, which includes Active Rolling Count (ARC), Protection Value (PV), and Message Timeout Event (Failsoft) implementations.

Figure 1:
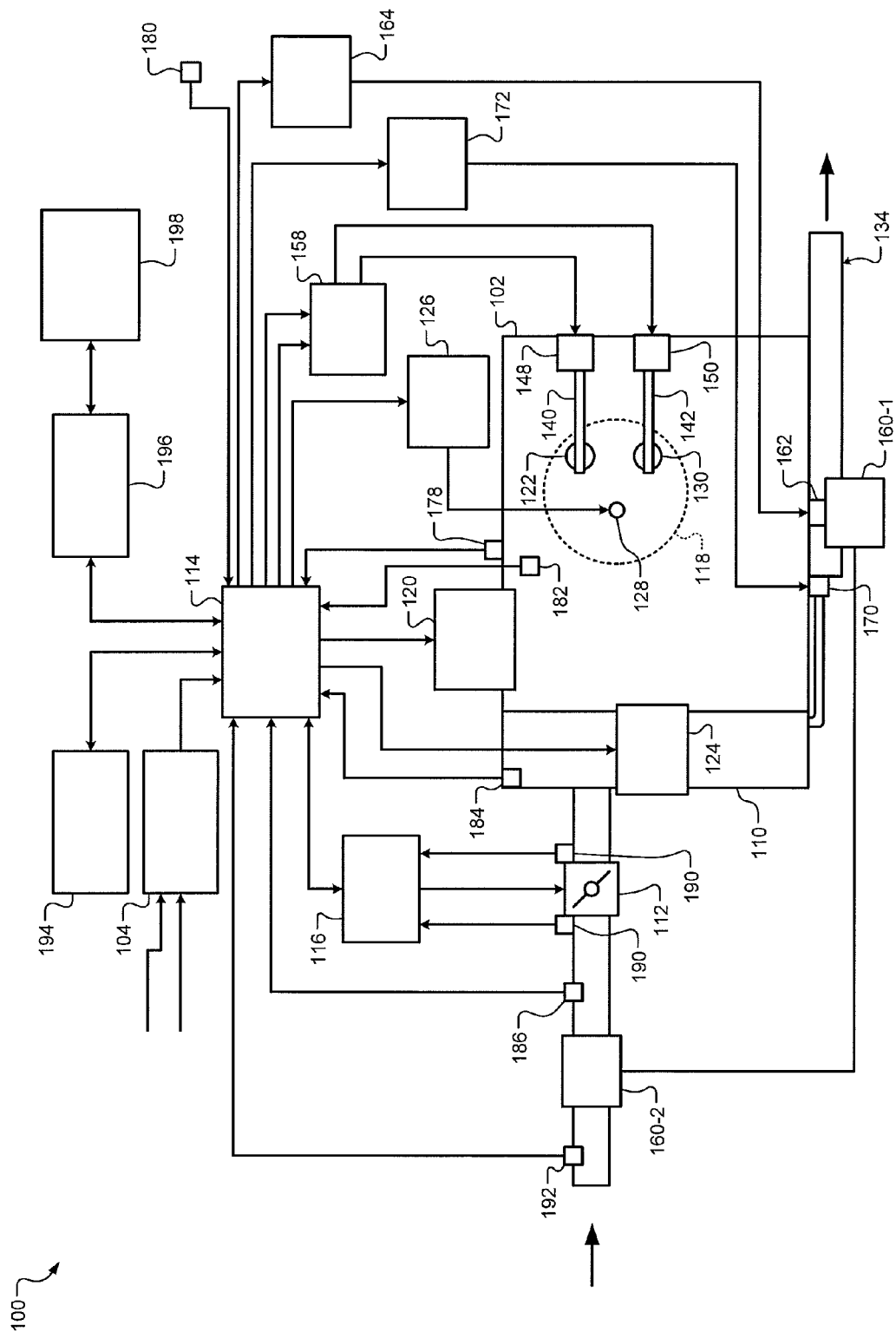
FIG. 1 is a functional block diagram of an engine system according to the principles of the present disclosure.

Referring now to FIG. 1, a functional block diagram of an exemplary engine system 100 is presented. The engine system 100 includes an engine 102 that combusts an air/fuel mixture to produce drive torque for a vehicle based on driver input(s) from a driver input module 104. The driver inputs may include, for example, one or more accelerator pedal positions (APPs) measured by APP sensors (not shown), one or more brake pedal positions (BPPs) measured by BPP sensors (not shown), and a cruise torque request provided by a cruise control system (not shown). In various implementations, the cruise control system may include an adaptive cruise control system that maintains a predetermined following distance.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into one or more cylinders of the engine 102. While the engine 102 may include more than one cylinder, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy in some circumstances.

The engine 102 may operate using a four-stroke engine cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions may be necessary for the cylinder 118 to experience all four of the strokes of one engine cycle.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve(s) of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture. During the compression stroke, a piston (not shown) within the cylinder 118 compresses the air/fuel mixture. Based on a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Combustion of the air/fuel mixture within a cylinder may be referred to as a firing event. The spark actuator module 126 may have the ability to vary the timing of the spark for each firing event. In addition, the spark actuator module 126 may have the ability to vary the spark timing for a given firing event even when a change in the timing signal is received after a firing event of a cylinder immediately before a given firing event.

During the combustion stroke, the combustion of the air/fuel mixture drives the piston away from the TDC position, thereby driving the rotation of the crankshaft. The combustion stroke may be defined as the time between the piston reaching TDC and the time at which the piston reaches a bottommost position, which may be referred to as bottom dead center (BDC).

During the exhaust stroke, the piston begins moving toward the TDC position again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to the TDC position by an intake cam phaser 148. The time at which the exhaust valve 130 is opened may be varied with respect to the TDC position by an exhaust cam phaser 150. A phaser actuator module 158 may control the intake cam phaser 148 and the exhaust cam phaser 150 based on signals from the ECM 114. When implemented, variable valve actuation (VVA) technologies (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 (e.g., a turbo bypass valve) may allow exhaust to bypass the turbine 160-1, thereby reducing the boost provided by the turbocharger. The boost may include, for example, the difference between pressure within the intake manifold 110 and pressure within an intake manifold of a naturally aspirated engine under the same operating conditions.

The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other near the location of the turbine 160-1, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbine 160-1. The EGR valve 170 may be controlled by an EGR actuator module 172.

The engine system 100 may measure rotational speed of the crankshaft in revolutions per minute (RPM) using an RPM sensor 178. The engine system 100 may measure speed of the vehicle using a vehicle speed sensor 180. The vehicle speed may be determined based on, for example, a transmission output shaft speed (TOSS), one or more wheel speeds, or another suitable measure of the vehicle speed. Temperature of engine coolant may be measured using an engine coolant temperature (ECT) sensor 182. The ECT sensor 182 may be located within the engine 102 or at other locations where the coolant is circulated, such as a radiator (not shown).

Pressure within the intake manifold 110 may be measured using a manifold absolute pressure (MAP) sensor 184. In various implementations, engine vacuum may be measured, where engine vacuum includes a difference between ambient air pressure and the pressure within the intake manifold 110. Mass air flow rate into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate operation of the engine 102 with a transmission (not shown). For example, the ECM 114 may reduce engine output torque during a gear shift. The engine 102 may output torque to the transmission via a torque transmission device (not shown), such as a torque converter and/or one or more clutches. The transmission control module 194 may also share data with the ECM 114, such as a current gear ratio engaged within the transmission indicated by one or more gear sensors (not shown) and a state of the torque transmission device. For example only, for the case of the torque converter, the state may include a locked state or an unlocked state of a torque converter clutch (TCC) (not shown).

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

An engine actuator varies one or more engine parameters by controlling an associated actuator value. For example only, the throttle actuator module 116 may be referred to as an engine actuator and the throttle opening area may be referred to as the associated actuator value. In the example of FIG. 1, the throttle actuator module 116 achieves the throttle opening area by adjusting an angle of the blade of the throttle valve 112.

Similarly, the spark actuator module 126 may be referred to as an engine actuator, while the associated actuator value may refer to the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the associated actuator values may include number of activated cylinders, fueling rate, intake and exhaust cam phaser angles, boost pressure, and EGR valve opening area, respectively. The ECM 114 may control actuator values in order to cause the engine 102 to generate a desired engine output torque and achieve desired engine parameters.

Various control modules of the engine system 100 (including, but not limited to, the engine control module 114) may include one or more main microprocessors (that communicate over, for example, a vehicle bus). For example, a distributed communications network such as a controller area network (CAN) may facilitate communication between the microprocessors over the vehicle bus. A microprocessor (i.e., a monitoring microprocessor) of one of the modules (e.g., the engine control module 114) may monitor sensor inputs received from a microprocessor (i.e., a monitored microprocessor) of another module (e.g., a SIM).

Figure 2:
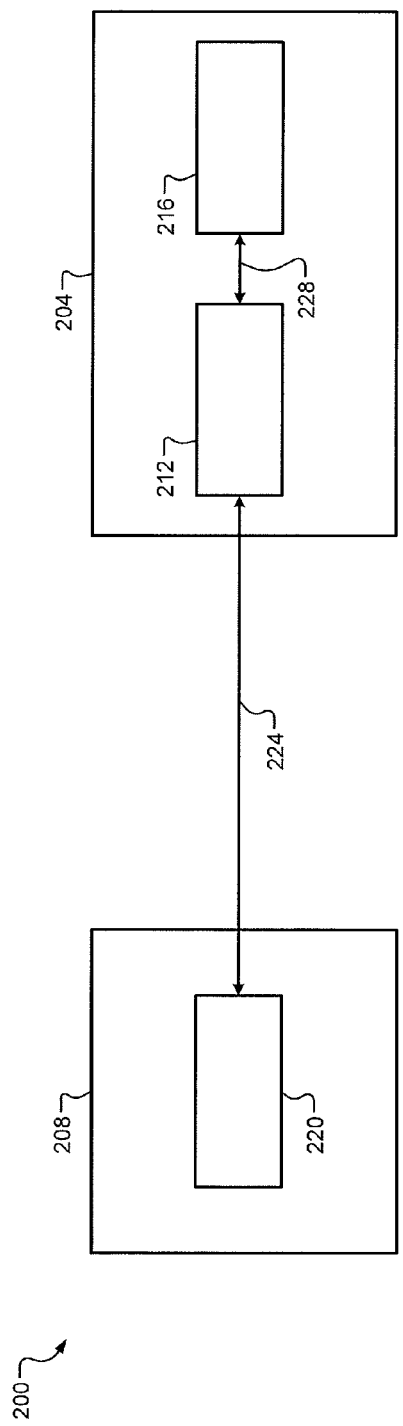
FIG. 2 is a functional block diagram of an example microprocessor verification system according to the principles of the present disclosure.

Referring now to FIG. 2, an example microprocessor verification system 200 is shown. Although the distributed system 200 is shown to include a control module 204 and a sensor input module 208, those skilled in the art can appreciate that the system 200 can include any suitable number of modules corresponding to control modules of the vehicle. For example only, the sensor input module 220 may correspond to a sensor input module associated with the ETRS. Conversely, the control module 204 may correspond to the engine control module 114 and includes a main microprocessor 212 and an optional secondary microprocessor 216. Although shown within the control module 204, the main microprocessor 212 (e.g., a monitoring processor) may be a high integrity microprocessor external to the control module 204 that monitors main microprocessors (such as a main microprocessor 220 of the sensor input module 208) and other vehicle microprocessors over a distributed network such (e.g., over a CAN bus 224. The monitoring microprocessor 212 may itself be monitored (e.g. by onboard monitor hardware) to ensure its own integrity. For example only, the monitoring microprocessor 212 may communicate with the optional secondary microprocessor 216 over a Serial Peripheral Interface bus 228.

Typically, a monitoring microprocessor 212 may periodically and/or conditionally challenge the integrity of the monitored microprocessor 220. For example, the monitoring microprocessor 212 may query the monitored microprocessor 220 and verify a response received from the monitored microprocessor 220 (e.g., using an exchange including the SKP). The monitoring microprocessor 212 determines whether the monitored microprocessor 220 is functioning properly based on the response. The monitoring microprocessor 212 may initiate remedial actions if the monitored microprocessor 220 is not functioning properly. For example, the monitoring microprocessor 212 may indicate that the monitored microprocessor 220 is in a failure mode including, but not limited to, fail to execute, incomplete execution, incorrect timing, and/or erroneous execution.

For example, the monitoring microprocessor 212 may generate a query (e.g. a seed) to transmit to the monitored microprocessor 220. For example only, the query may include a 4 bit number between 0 and 15 (i.e. 0000 and 1111) that is transmitted to the monitored microprocessor 220 over the CAN bus 224. The monitoring microprocessor 212 may transmit a plurality (e.g. 16) of queries sequentially from 0000 to 1111 to the monitored microprocessor 220.

The monitoring microprocessor 212 receives answers (e.g. keys) to the queries transmitted to the monitored microprocessor 220 and determines whether the answers to the queries are correct. For example, each query may have a corresponding expected answer. The monitoring microprocessor 212 compares each received answer to the corresponding expected answer based on the query received from the monitored microprocessor 220. If the received answer matches the expected answer, the received answer is validated. Accordingly, no remedial action is required because the monitored microprocessor 220 is deemed to be functioning properly. Each of the queries 0000 through 1111 may have a unique corresponding answer. For example, each answer may also be a 4 bit number between 0 and 15.

If the received answer does not match the expected answer, the monitoring microprocessor 212 may take one or more remedial actions, which may include, but are not limited to, assuming the processing functions of the monitored microprocessor 220, ignoring inputs received from the monitored microprocessor 220, informing other modules of the fault status of the monitored microprocessor 220, disabling outputs of the monitored microprocessor 220, instructing other modules to ignore inputs received from the monitored microprocessor 220.

The monitoring microprocessor 212 may detect other faults that affect answer validation. For example, the monitoring microprocessor 212 may receive an indication of loss of communication on the bus 224 (i.e. a loss of communication fault), communication data faults (e.g. a rolling count error, based on an active rolling count), and/or a "stuck" query fault. A stuck query fault refers to a query value that does not change in consecutive queries over a predetermined period of time. For example, the transmitted query may be stuck at 0000 instead of incrementing sequentially between 0000 and 1111. When no other faults are detected or only a stuck query is detected, an invalid answer indicates that the monitored microprocessor 220 is not functioning properly. Conversely, when the only fault is a stuck query fault, the monitoring microprocessor 212 may be unable to diagnose a source of the fault. Loss of communication or communication data faults indicate that the monitoring microprocessor 212 is no longer able to monitor the monitored microprocessor 220.

Conversely, the monitored microprocessor 220 typically receives the query (i.e., seed) from the monitoring microprocessor 212, generates an answer (i.e., key) based on the seed, and transmits the seed and the key (i.e., the SKP) to the monitoring microprocessor 212. If the monitored microprocessor 212 is not functioning properly, the answer corresponding to the SKP transmitted to the monitoring microprocessor 212 will not match the expected answer. Accordingly, the SKP validates the integrity of the monitored microprocessor 220.

The monitored microprocessor 220 according to the present disclosure transmits the SKP regardless of whether a query is received from the monitoring microprocessor 212. For example, the monitored microprocessor 220 transmits the SKP to the monitoring microprocessor 212 along with processed sensor input data. For example, the monitored microprocessor 220 includes the SKP each time processed sensor input data is transmitted to the monitoring microprocessor 212. In this manner, the monitoring microprocessor 212 does not need to transmit a request for the SKP to the monitored microprocessor 220. For example, the SKP may be packed in a same message as the processed sensor input data. The monitored microprocessor 220 may also include an active rolling count and/or a protection value in the message. For example only, a single CAN message may include 8 bytes of data. The SKP may be 4-7 bits. Accordingly, the single CAN message may include both the sensor input data and the SKP.

Figure 3:
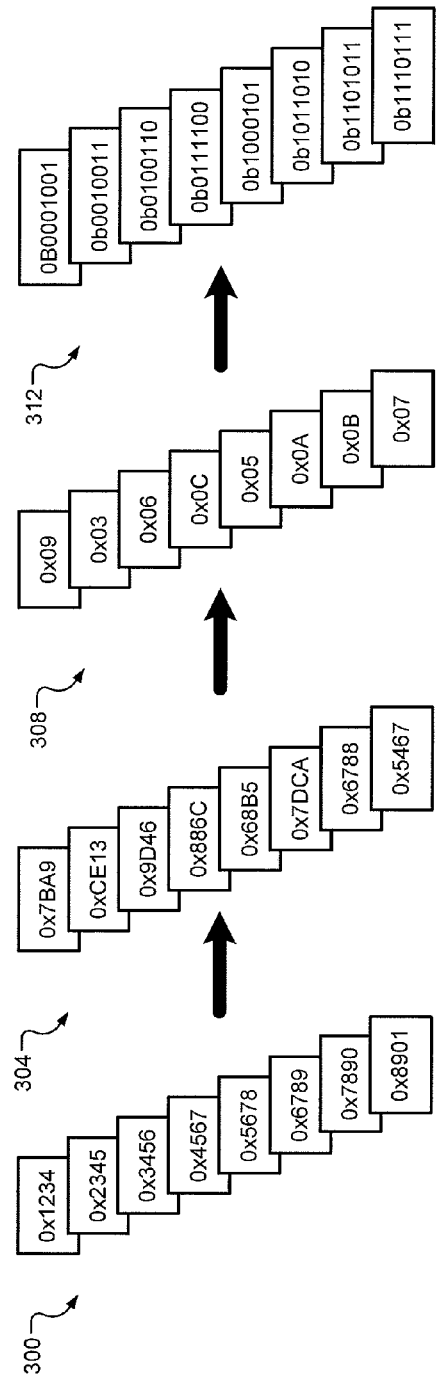
FIG. 3 illustrates a first example seed key pair calculation according to the principles of the present disclosure.

Referring now to FIG. 3, the monitored microprocessor 220 may start with one or more 16-bit keys selected from a 16-bit, 8-element seed array 300. For example, the sensor input module 208 may store (in read only memory) or generate the seed array 300. For example only, the seed array 300 includes 8 unique 16-bit constants (i.e., seeds) defined as an array having an index from 0 to 7. A seed index may be initialized at 0 upon power on of the vehicle. Accordingly, a SKP corresponding to index 0 may transmitted first, followed by index 1, 2, . . . , and 7. The monitored microprocessor 220 may execute an ALU test routine designed to exercise all relevant ALU operations of the monitored microprocessor 220, which uses the seeds from the seed array 300 as inputs to calculate 8 corresponding keys. The 8 calculated keys are also placed in a 16-bit, 8-element key array 304 having the index from 0 to 7. The key array 304 can be further mapped to an 8-bit, 8-element key array 308, wherein only a lower nibble of the 8-bits is significant. The 3-bit seed array index (0 to 7) and its corresponding 4-bit key are packed as a 7-bit SKP in an SKP array 312. The 7-bit SKPs can each then be inserted into a single CAN message along with the processed sensor input data, the active rolling count, and the protection value.

The monitored microprocessor 220 may generate the one or more SKPs each time sensor input data is sampled, for example. The monitoring microprocessor 212 receives the SKPs and compares the SKPs received from the monitored microprocessor 220 to a predetermined set of correct (e.g., predetermined) SKPs stored in the control module 204 (e.g., in read only memory). For example, the monitoring microprocessor 212 examines the received SKPs to verify that both sequence (i.e., the sequence of the seed index as received) of the array 312 and contents of the 7-bit SKPs are correct. In other words, the first 4 bits correspond to the calculated key, while the next 3 bits correspond to the index from 0 to 7. If either the sequence of the seed index (e.g., the received SKP has an index that does not correctly match the expected sequence) or the content of keys is incorrect (e.g., by comparing each of the keys to the corresponding predetermined keys stored by the control module 204), a diagnostic counter (e.g., a retry counter) is incremented and the corresponding received sensor data is discarded. When the diagnostic counter reaches a calibrated threshold, monitoring microprocessor 212 stores an indicator of a fault in the ALU integrity of the monitored microprocessor 220 (e.g., sets a diagnostic trouble code) and may take one or more other remedial actions as described above.

Figure 4:
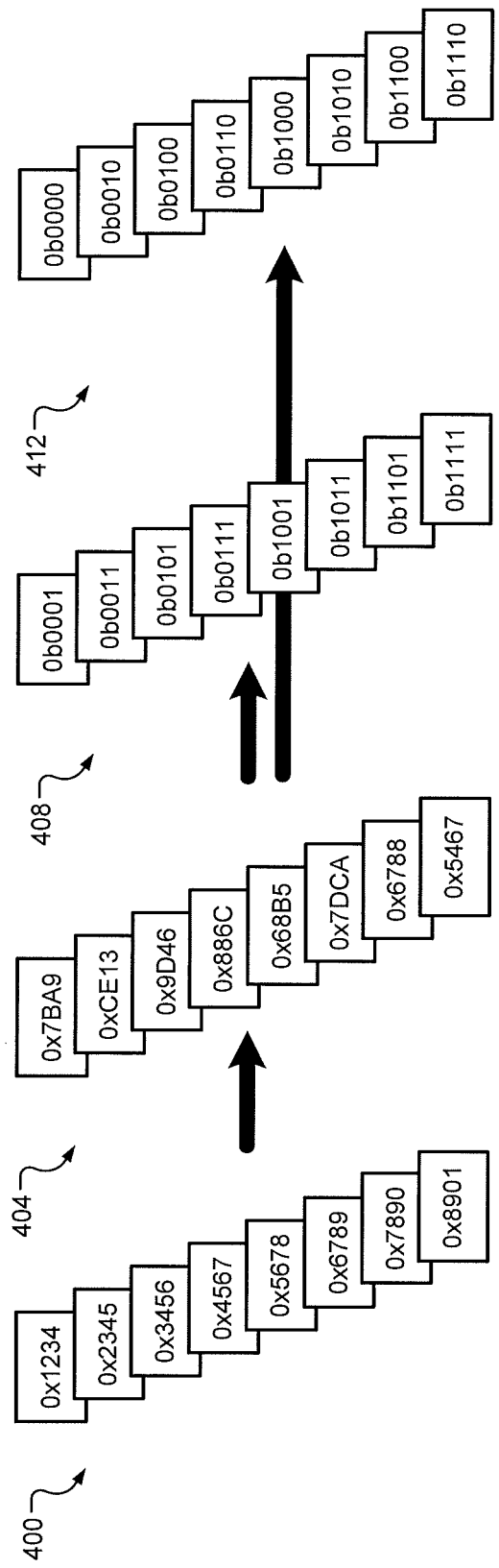
FIG. 4 illustrates a second example seed key pair calculation according to the principles of the present disclosure.

Referring now to FIG. 4, another example calculation of SKPs from a 16-bit 8-element seed array 400 is shown. The monitored microprocessor 220 executes the ALU test routine on the seed array 400 to calculate 8 corresponding keys. The 8 calculated keys are also placed in a 16-bit, 8-element key array 404 having an index from 0 to 7. Instead of mapping the key array 404 to an 8-bit, 8-element key array as shown in FIG. 3, the control module 204 calculates a 1-bit Boolean validity flag (e.g., a 1 or 0 indicating TRUE or FALSE, respectively) and packs the 3-bit seed array index (0 to 7) with the validity flag into a 4-bit SKP, as shown in either the SKP array 412 (where the validity flag=1) or the SKP array 416 (where the validity flag=0).

The validity flag corresponds to whether the calculated keys in the key array 404 are correct. For example, instead of the monitoring microprocessor 212 storing the predetermined set of correct keys, the sensor input module 208 may store the predetermined set of correct keys in read only memory. Accordingly, the keys in the key array 404 calculated by the monitored microprocessor 220 are simply compared to the predetermined set of correct keys in the sensor input module 208. If a key is correct, a corresponding validity flag for that key is 1. Conversely, if a key is not correct, a corresponding validity flag for that key is 0. In some implementations, the monitored microprocessor 220 may be allowed one or more retries for calculating the correct key for a given seed.

As shown in FIG. 3, the 7-bit SKP requires 3 more bits out of total (64-bit data bandwidth of a CAN message) than the 4-bit SKP of FIG. 4. However, the 7-bit SKP maximizes independency between the monitored microprocessor 220 and the monitoring microprocessor 212 because the seed array 300 stored in the sensor input module 208 is separate from a corresponding predefined array stored in the control module 204. Conversely, the 4-bit SKP reduces an amount of time to identify and/or confirm a calculated key failure since the sensor input module 208 itself checks the validity of the calculated key. Accordingly, any time delay due to communication over the CAN bus 224 is eliminated.

In some implementations, the monitored microprocessor 220 of FIG. 2 may transmit two of the CAN messages including the SKP at different periodic rates on two different CAN buses. For example, the monitored microprocessor 220 may transmit CAN messages including the 7-bit SKPs of FIG. 3 at a 25 millisecond rate on a first CAN bus and transmit CAN messages including the 4-bit SKPs of FIG. 4 at a 100 millisecond rate.

Figure 5:
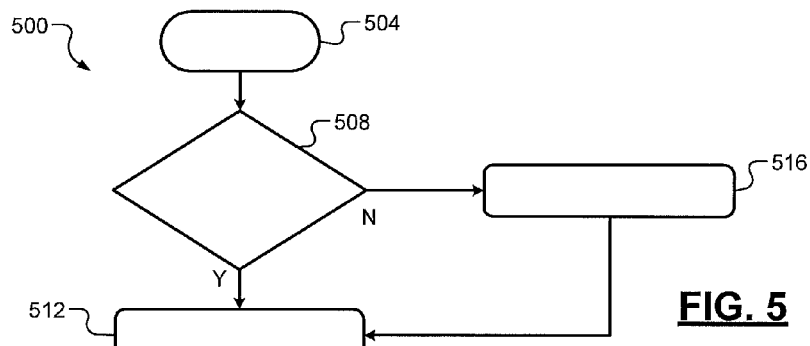
FIG. 5 illustrates a first example seed key pair generation method according to the principles of the present disclosure.

Referring now to FIG. 5, an example SKP generation method 500 executed by the monitored microprocessor 220 (as described in FIG. 3) begins at 504. At 508, the method 500 determines if the seed index is less than seven. If true, the method 500 continues to 512. If false, the method 500 continues to 516. At 516, the method 500 resets the seed index to zero. At 512, the method 500 calculates a 16-bit key from a 16-bit seed at a current seed index. At 520, the method 500 maps the 16-bit key to an 8-bit key and stores the 8-bit key to an 8-bit, 8-element array. At 524, the method 500 packs the 3-bit seed index and the 4-bit key into a 7-bit SKP. At 528, the method 500 increments the seed index. The method 500 ends at 532.

Figure 6:
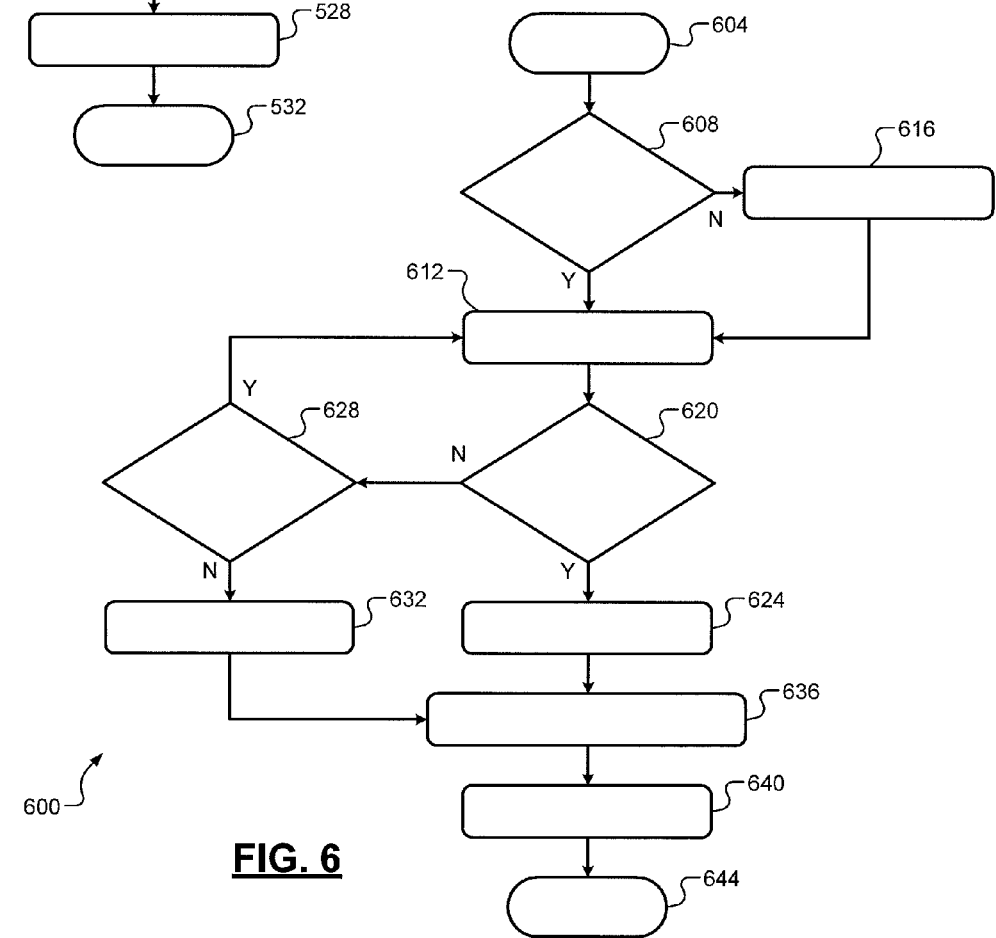
FIG. 6 illustrates a second example seed key pair generation method according to the principles of the present disclosure.

Referring now to FIG. 6, an example SKP generation method 600 executed by the monitored microprocessor 220 (as described in FIG. 4) begins at 604. At 608, the method 600 determines if the seed index is less than seven. If true, the method 600 continues to 612. If false, the method 600 continues to 616. At 616, the method 600 resets the seed index to zero. At 612, the method 600 calculates a 16-bit key from a 16-bit seed at a current seed index. At 620, the method 600 determines whether the calculated key matches a corresponding key from a predetermined set of correct keys. If true, the method 600 continues to 624. If false, the method 600 continues to 628. At 628, the method 600 determines whether to retry the calculation of the key. If true, the method 600 continues to 612. If false, the method 600 continues to 632. At 632, the method 600 sets a validity flag to 0 (FALSE). At 624, the method 600 sets the validity flag to 1 (TRUE). At 636, the method 600 packs the seed index and the validity flag into a 4-bit SKP. At 640, the method 600 increments the seed index. The method 600 ends at 644.

Figure 7:
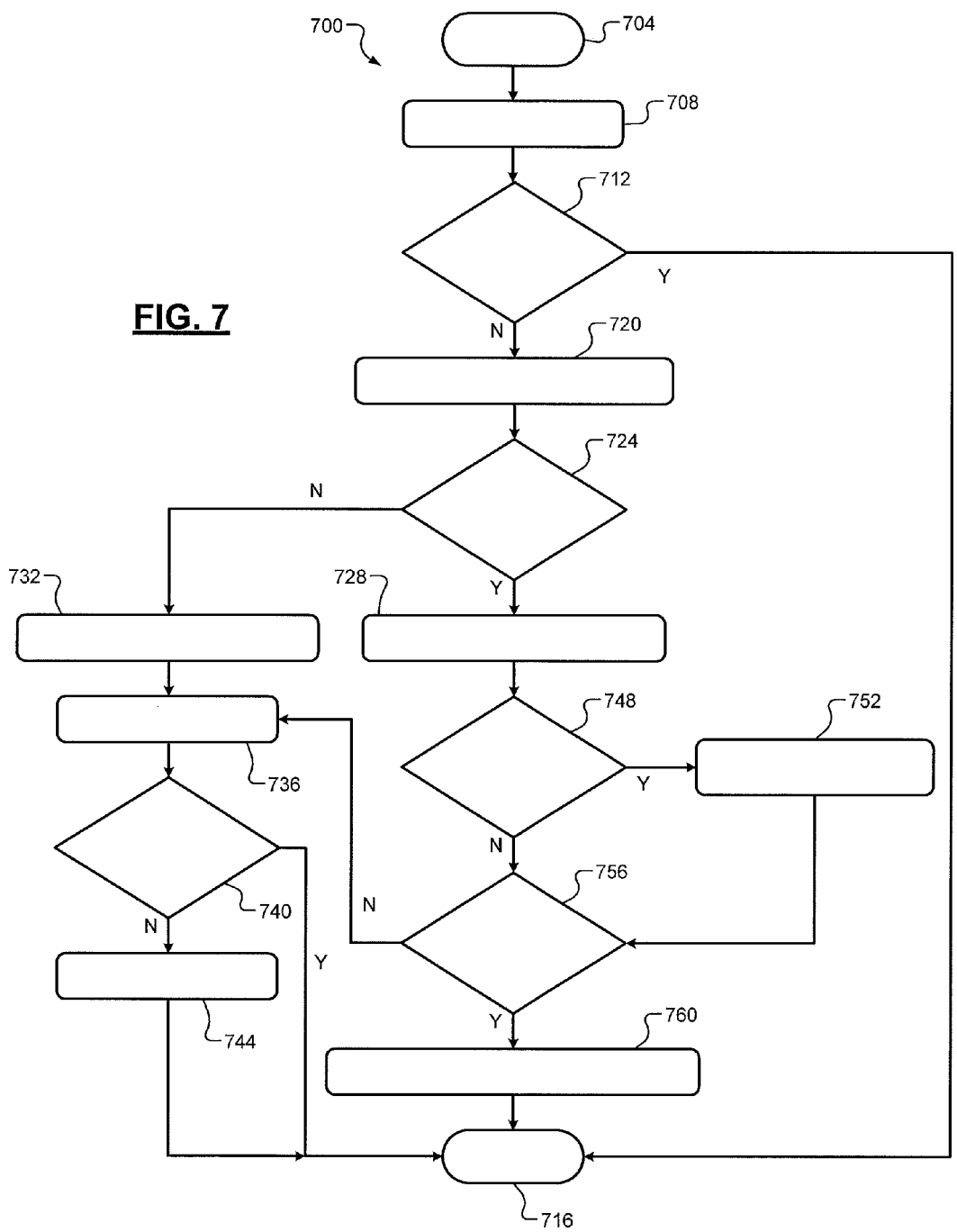
FIG. 7 illustrates a first example seed key pair verification method according to the principles of the present disclosure.

Referring now to FIG. 7, an example SKP verification method 700 executed by the monitoring microprocessor 212 (as described in FIG. 3) begins at 704. At 708, the method 700 receives the CAN message including the sensor input data, the SKP, and other data (e.g., the active rolling count and/or protection value). At 712, the method 700 determines whether the CAN message indicates a non-SKP fault (e.g., an active rolling count error, a protection value error, etc.). If true, the method 700 ends at 716. If false, the method 700 continues to 720. At 720, the method 700 unpacks the 7-bit SKP from the CAN message into a seed index and key. At 724, the method 700 determines whether the seed index matches an expected seed index. If true, the method 700 continues 728. If false, the method 700 continues to 732.

At 732, the method 700 increments the expected seed index. At 736, the method 700 increases a retry count. At 740, the method 700 determines whether the retry count is less than a threshold. If true, the method 700 ends at 716. If false, the method 700 continues to 744. At 744, the method 700 indicates an SKP failure and ends at 716.

At 728, the method 700 increments the expected seed index. At 748, the method 700 determines whether the expected seed index is greater than seven. If true, the method 700 continues to 752. If false, the method 700 continues to 756. At 752, the method 700 resets the expected seed index to 0. At 756, the method 700 determines whether the key matches an expected key corresponding to the seed index. If true, the method 700 continues to 760. If false, the method 700 continues to 736. At 760, the method 700 uses the processed sensor data included in the CAN message, resets the retry count to 0, and ends at 716.

Figure 8:
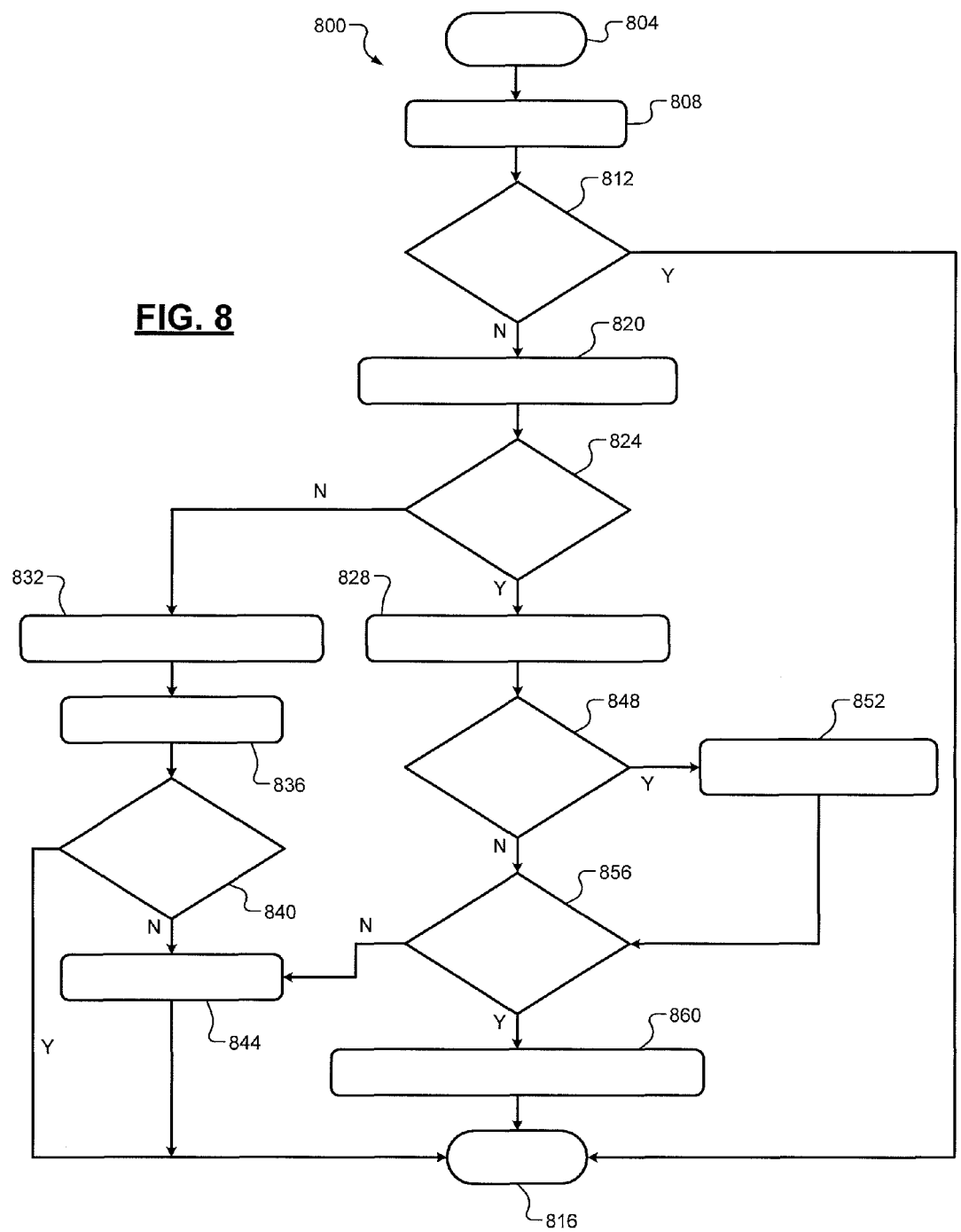
FIG. 8 illustrates a second example seed key pair verification method according to the principles of the present disclosure.

Referring now to FIG. 8, an example SKP verification method 800 executed by the monitoring microprocessor 212 (as described in FIG. 4) begins at 804. At 808, the method 800 receives the CAN message including the sensor input data, the SKP, and other data (e.g., the active rolling count and/or protection value). At 812, the method 800 determines whether the CAN message indicates a non-SKP fault (e.g., an active rolling count error, a protection value error, etc.). If true, the method 800 ends at 816. If false, the method 800 continues to 820. At 820, the method 800 unpacks the 4-bit SKP from the CAN message into a seed index and key. At 824, the method 800 determines whether the seed index matches an expected seed index. If true, the method 800 continues 828. If false, the method 800 continues to 832.

At 832, the method 700 increments the expected seed index. At 836, the method 800 increases a retry count. At 840, the method 800 determines whether the retry count is less than a threshold. If true, the method 800 ends at 816. If false, the method 800 continues to 844. At 844, the method 800 indicates an SKP failure and ends at 816.

At 828, the method 800 increments the expected seed index. At 848, the method 800 determines whether the expected seed index is greater than seven. If true, the method 800 continues to 852. If false, the method 800 continues to 856. At 852, the method 800 resets the expected seed index to 0. At 856, the method 800 determines whether the validity flag is 1 (TRUE). If true, the method 800 continues to 860. If false, the method 800 continues to 844. At 860, the method 800 uses the processed sensor data included in the CAN message, resets the retry count to 0, and ends at 816.

In the manner described above in FIGS. 2-8, the need for bidirectional seed and key message exchanges between monitoring and monitored microprocessors (and corresponding ECUs) is eliminated, increasing microprocessor ALU integrity test algorithm robustness against potential communication protocol timing or noise interference over serial communication buses. Further, synchronization requirements between corresponding real-time operating systems tasks running independently within the monitoring and the monitored microprocessors can be eliminated. In some implementations, microprocessor ALU integrity test algorithms may be applied across ECUs (i.e., the algorithms are not limited to being executed within single a ECU due to the Serial Peripheral Interface bus) with different serial communication topology (e.g., different numbers of ECUs, serial communication buses, CAN/LIN combinations, etc.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system, comprising:
a first module of a vehicle, wherein the first module stores at least one seed value, calculates a key based on the at least one seed value, forms a seed key pair based on the calculated key and the at least one seed value, generates a data bus message including the seed key pair and data corresponding to operation of the first module, and transmits, over a distributed vehicle network, the data bus message; and
a second module of the vehicle, wherein the second module receives the data bus message over the distributed vehicle network, retrieves the seed key pair from the data bus message, determines whether the calculated key matches an expected key, and selectively verifies integrity of the first module based on the determination of whether the calculated key matches the expected key.

2. The system of claim 1, wherein the first module includes a first microprocessor that calculates the key based on the at least one seed value, and wherein the second module includes a second microprocessor that selectively verifies the integrity of the first microprocessor based on the determination of whether the calculated key matches the expected key.

3. The system of claim 1, wherein the seed key pair includes a seed index value, the second module determines whether the seed index value matches an expected seed index value, and the second module verifies the integrity of the first module further based on the determination of whether the seed index value matches the expected seed index value.

4. The system of claim 1, wherein storing the at least one seed value includes storing an array of a plurality of different seed values.

5. The system of claim 4, wherein calculating the key includes calculating an array of keys based on the plurality of different seed values.

6. The system of claim 5, wherein forming the seed key pair includes forming an array of seed key pairs.

7. The system of claim 1, wherein, if the second module verifies the integrity of the first module based on the determination of whether the calculated key matches the expected key, the second module uses the data corresponding to the operation of the first module.

8. The system of claim 7, wherein the data corresponding to the operation of the first module corresponds to sensor input data.

9. The system of claim 7, wherein, if the second module does not verify the integrity of the first module based on the determination of whether the calculated key matches the expected key, the second module indicates a fault in the first module and does not use the data corresponding to the operation of the first module.

10. A system, comprising:
a first module of a vehicle, wherein the first module stores at least one seed value, calculates a key based on the at least one seed value, determines whether the calculated key matches an expected key stored within the first module, forms a seed key pair based on the determination and the at least one seed value, generates a data bus message including the seed key pair and data corresponding to operation of the first module, and transmits, over a distributed vehicle network, the data bus message; and
a second module of the vehicle, wherein the second module receives the data bus message over the distributed vehicle network, retrieves the seed key pair from the data bus message, determines whether the seed key pair includes an indication that the calculated key matched the expected key, and selectively verifies integrity of the first module based on the determination of whether the seed key pair included the indication that the calculated key matched the expected key.

11. The system of claim 10, wherein the first module includes a first microprocessor that calculates the key based on the at least one seed value, and wherein the second module includes a second microprocessor that selectively verifies the integrity of the first microprocessor based on the determination of whether the seed key pair included the indication that the calculated key matched the expected key.

12. The system of claim 10, wherein the seed key pair includes a seed index value, the second module determines whether the seed index value matches an expected seed index value, and the second module verifies the integrity of the first module further based on the determination of whether the seed index value matches the expected seed index value.

13. The system of claim 10, wherein storing the at least one seed value includes storing an array of a plurality of different seed values.

14. The system of claim 13, wherein calculating the key includes calculating an array of keys based on the plurality of different seed values.

15. The system of claim 14, wherein forming the seed key pair includes forming an array of seed key pairs.

16. The system of claim 10, wherein, if the second module verifies the integrity of the first module based on the determination of whether the seed key pair included the indication that the calculated key matched the expected key, the second module uses the data corresponding to the operation of the first module.

17. The system of claim 16, wherein the data corresponding to the operation of the first module corresponds to sensor input data.

18. The system of claim 16, wherein, if the second module does not verify the integrity of the first module based on the determination of whether the seed key pair included the indication that the calculated key matched the expected key, the second module indicates a fault in the first module and does not use the data corresponding to the operation of the first module.

19. A method for verifying the integrity of a first microprocessor in a vehicle using a second microprocessor in the vehicle, the method comprising:
in a first module that includes the first microprocessor,
storing at least one seed value,
calculating a key based on the at least one seed value,
forming a seed key pair based on the calculated key and the at least one seed value,
generating a data bus message including the seed key pair and data corresponding to operation of the first module, and
transmitting, over a distributed vehicle network, the data bus message; and
in a second module that includes the second microprocessor,
receiving the data bus message over the distributed vehicle network,
retrieving the seed key pair from the data bus message,
determining whether the calculated key matches an expected key, and
selectively verifying integrity of the first microprocessor based on the determination of whether the calculated key matches the expected key.

* * * * *